Patented May 10, 1949

2,469,967

UNITED STATES PATENT OFFICE 2,469,967

CYCLOPENTANO PERHYDROPHENAN-THRENE COMPOUNDS

Emil Kaiser and Jerry Svarz, Chicago, Ill., assignors to Armour and Company, Chicago, Ill., a corporation of Illinois No Drawing. Application April 17, 1946, Serial No. 662,930

8 Claims. (Cl. 260—397.1)

This invention relates to compounds of the cyclopentano perhydrophenanthrene series and more particularly to adrenalin salts of cyclopentano perhydrophenanthrene malonic acids.

In our application Serial No. 577,932, now abandoned, we describe cyclopentano perhydrophenanthrene maloic acids and set forth methods of their preparation. As described in said application, a method of preparing such acids involves reaction of an organic sulfonic ester of an alcohol of the cyclopentano perhydrophenanthrene series such as cholesteryl p-toluenesulfonate, ergosteryl methane-sulfonate, testosterone methane sulfonate, dehydro androsterone benzene sulfonate and cholesterol methane-sulfonate.

In carrying out this reaction the two reactants are mixed preferably in a solvent and heat may be used to speed the reaction. When the reaction is complete the solvent is filtered off and the cyclopentano perhydrophenanthrene ester recovered. The ester product may then be converted to a free acid by alkali treatment. When the organic sulfonic ester used is a 3-hydroxy compound, the resulting acid product will contain isomers which can be separated in accordance with their solubility in petroleum ether. One of the isomers is soluble in petroleum ether while the other is not.

We have now found that adrenalin can be combined with the cyclopentano perhydrophenanthrene maloic acids to yield new compounds which are therapeutically useful.

Any of the cyclopentano perhydrophenanthrene malonic acids prepared as above indicated or by any other method may be combined with adrenalin in accordance with our present invention. We may use the isomer which is soluble in petroleum ether or the isomer which is insoluble in petroleum ether, and we may prepare either the mono adrenalin salt or the di adrenalin salt of the acids.

Examples of the malonic acids which may be used are as follows:

Cholesteryl malonic acid, $C_{27}H_{45}CH(COOH)_2$
Ergosteryl malonic acid, $C_{28}H_{43}CH(COOH)_2$
Stigmasterol malonic acid, $C_{29}H_{46}CH(COOH)_2$
Sitosterol malonic acid, $C_{27}H_{45}CH(COOH)_2$ In carrying out the reaction according to our invention we may mix the cyclopentano perhydrophenanthrene malonic acid with adrenalin in a container and allow the reaction to proceed. We prefer to dissolve the ingredients in a solvent such as benzyl alcohol and use gentle heat to speed the reaction. The reaction product, which is the adrenalin salt of the malonic acid, may be recovered from the solvent by evaporation.

To combine 2 mols of adrenalin with one mol of acid in the above procedure, the reaction mixture may be poured into a relatively large volume of a solvent such as ether or ether-petroleum ether mixtures to precipitate the adrenalin salt. This product is insoluble in water and in organic solvents.

When one mol of adrenalin is combined with one mol of acid in the procedure above set forth, the resulting product contains the mono adrenalin salt of the acids. In this case the solvent may be evaporated at reduced pressures and relatively low temperatures to obtain the adrenalin salt in solid form.

The adrenalin salt prepared as above explained and suitably contained in a solvent may be administered therapeutically. The solvent should be one adapted for therapeutic use such as benzyl alcohol. Another preferred practice is to dissolve the adrenalin salt in an oil carrier using a vegetable oil such as olive oil, and administering the adrenalin salt in the oil carrier. In some cases we prefer to use mixtures of the vegetable oil and solvent as a carrier for the adrenalin salt.

Specific examples of our processes are given as follows:

EXAMPLE 1

*Preparation of di-adrenalin salt of petroleum ether soluble cholesteryl malonic acid*

Ninety four hundredths of a gram of petroleum ether soluble cholesteryl malonic acid and 0.37 g. of adrenalin were dissolved in 15 cc. of benzyl alcohol by gentle heating. The solution was filtered and the di-adrenalin salt precipitated by adding first 150 cc. of ether and then 100 cc. of petroleum ether to the benzyl alcohol solution. The precipitate was filtered off, washed with ether, and dried in a vacuum desiccator at room temperature.

Calculated: C, 68.78; H, 8.83; N, 3.35. Found: C, 68.21; H, 8.93; N, 3.23.

EXAMPLE 2

*Preparation of di-adrenalin salt of petroleum ether soluble stigmasteryl malonic acid*

Ninety nine hundredths of a gram of petroleum ether soluble stigmateryl malonic acid and 0.37 g. of adrenalin were dissolved in 15 cc. of benzyl alcohol by gentle heating. The solution was filtered and the di-adrenalin salt precipitated by adding first 150 cc. of ether and then 150 cc. of petroleum ether to the benzyl alcohol solution.

The precipitate was filtered off, washed with ether, and dried in a vacuum desiccator at room temperature.

EXAMPLE 3

*Preparation of di-adrenalin salt of petroleum ether soluble ergosteryl malonic acid*

Ninety six hundredths of a gram of petroleum ether soluble ergosteryl malonic acid and 9.37 g. of adrenalin were dissolved in 15 cc. of benzyl alcohol by gentle heating. The solution was filtered and the di-adrenalin salt precipitated by adding first 150 cc. of ether and 100 cc. of petroleum ether to the benzyl alcohol solution. The precipitate was filtered off, washed with ether and dried in a vacuum desiccator.

EXAMPLE 4

*Preparation of di-adrenalin salt of petroleum ether insoluble cholesteryl malonic acid*

Ninety four hundredths of a gram of petroleum ether insoluble cholesteryl malonic acid was dissolved in 15 cc. of benzyl alcohol by gentle heating. Next 0.37 g. of adrenalin was added and the mixture heated on the steam bath for a few minutes. The adrenalin dissolved almost completely. When the filtered solution was poured into 200 cc. of ether, a white precipitate settled out. The precipitate was separated, washed with ether, dried in a vacuum desiccator at room temperature.

Calculated: C, 67.78; H, 8.83; N, 3.35. Found: C, 67.04; H, 8.70; N, 3.61.

EXAMPLE 5

*Preparation of di-adrenalin salt of petroleum ether insoluble stigmasteryl malonic acid*

Ninety nine hundredths of a gram of petroleum ether insoluble stigmasteryl malonic acid was dissolved in 15 cc. of benzyl alcohol by gentle heating. Next 0.37 g. of adrenalin was added and the mixture heated on the steam bath for a few minutes. The adrenalin dissolved almost completely. When the filtered solution was poured into 200 cc. of ether, a white precipitate settled out. The precipitate was separated, washed with ether and dried in a vacuum desiccator at room temperature.

EXAMPLE 6

*Preparation of di-adrenalin salt of petroleum ether insoluble ergosteryl malonic acid*

Ninety six hundredths of a gram of petroleum ether insoluble ergosteryl malonic acid was dissolved in 15 cc. of benzyl alcohol by gentle heating. Next 0.37 g. of adrenalin was added and the mixture heated on the steam bath for a few minutes. The adrenalin dissolved almost completely. When the filtered solution was poured into 200 cc. of ether, a white precipitate settled out. The precipitate was separated, washed with ether and dried in a vacuum desiccator at room temperature.

EXAMPLE 7

*Preparation of mono-adrenalin salt of petroleum ether in soluble cholesteryl malonic acid*

Ninety four hundredths grams of cholesteryl malonic acid, insoluble in petroleum ether, and 0.37 g. of adrenalin were dissolved in ethyl alcohol by warming on a steam bath. The solution was then evaporated to dryness under diminished pressure. What remained was the mono-adrenalin salt of cholesteryl malonic acid. It was soluble in alcohol benzyl alcohol, propyeneglycol and other solvents.

Other adrenalin salts of the sterol malonic acids may be prepared using procedures similar to those outlined in the above specific examples. For example, we may prepare a mono adrenalin salt of stigmasterol malonic acid which is insoluble in petroleum ether as well as the adrenalin salt of ergosteryl malonic salt.

The foregoing detailed description and examples have been given for purposes of explanation only and it is expected that the invention may be practiced in widely varying forms and in connection with many other specific compounds, all within the spirit of the invention.

We claim:

1. A compound of the formula

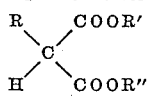

where R is a cyclopentano perhydrophenanthrene structure, R' is adrenalin and R'' is a structure chosen from the group consisting of hydrogen and adrenalin.

2. A compound of the formula

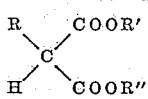

where R is a cyclopentano perhydrophenanthrene structure having the composition $C_{27}H_{45}$, R' is adrenalin, and R'' is a structure chosen from the group consisting of hydrogen and adrenalin.

3. A compound of the formula

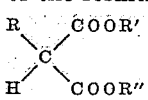

where R is a cyclopentano perhydrophenanthrene structure having the composition $C_{28}H_{43}$, R' is adrenalin, R'' is a structure chosen from the group consisting of hydrogen and adrenalin.

4. An adrenalin salt of a cyclopentano perhydrophenanthrene malonic acid.

5. A di adrenalin salt of a cyclopentano perhydrophenanthrene malonic acid.

6. A mono adrenalin salt of a cyclopentano perhydrophenanthrene malonic acid.

7. An adrenalin salt of a petroleum ether soluble cyclopentano perhydrophenanthrene malonic acid.

8. An adrenalin salt of a petroleum ether insoluble cyclopentano perhydrophenanthrene malonic acid.

EMIL KAISER.
JERRY SVARZ.

REFERENCES CITED

The following references are of record in the file of this patent:

UNITED STATES PATENTS

| Number | Name | Date |
| --- | --- | --- |
| 2,055,083 | Klein | Sept. 22, 1936 |
| 2,333,581 | Roberts | Nov. 2, 1943 |

OTHER REFERENCES

Inagaki et al., Chem. Abst. vol. 27 (1933), page 3780.

Goetzi et al., Proc. Soc. Exp. Biol. Med., April 1944, pages 248–250.

Tuffi, Chemical Abstracts, vol. 28 (1933), page 3526.

Martindale, Extra Pharmacopoeia, vol. 1, 22nd ed., 1941, page 431. Pharmaceutical Press, London.

Certificate of Correction

May 10, 1949.

Patent No. 2,469,967.

EMIL KAISER ET AL.

It is hereby certified that errors appear in the printed specification of the above numbered patent requiring correction as follows:

Column 1, lines 7 and 31, for "maloic" read *malonic*; line 51, for "acid" read *acids*; column 2, line 50, for "stigmateryl" read *stigmasteryl*; column 4, line 7, for the word "salt" read *acid*;

and that the said Letters Patent should be read with these corrections therein that the same may conform to the record of the case in the Patent Office.

Signed and sealed this 25th day of October, A. D. 1949.

[SEAL]

THOMAS F. MURPHY,
*Assistant Commissioner of Patents.*